July 8, 1969  H. I. MURPHY  3,453,948

PIE SHELL SHAPER

Filed Sept. 22, 1967

INVENTOR.
HELEN I. MURPHY
BY
Fishburn Gold & Litman
ATTORNEYS

United States Patent Office 3,453,948
Patented July 8, 1969

3,453,948
PIE SHELL SHAPER
Helen I. Murphy, 806 E. 117th St.,
Kansas City, Mo. 64131
Filed Sept. 22, 1967, Ser. No. 669,798
Int. Cl. A47j 43/00, 36/22, 37/00
U.S. Cl. 99—433                             2 Claims

ABSTRACT OF THE DISCLOSURE

A pie shell shaper to be placed on uncooked pie dough in a pie pan for holding said dough during cooking and comprising a circular base portion, an intermediate portion sloping upwardly and outwardly from the base portion, an annular rim extending outwardly from the top of the intermediate portion, and an annular ring connected to the periphery of the annular rim. The shaper is of sufficient weight and rigidity to hold the dough and may be a wire mesh and either reticulated or formed of concentric rings and radial spokes.

---

Heretofore in the making of pie shells for fillings the dough has been placed in pans and cooked, but there is a tendency for the dough to buckle, bubble or otherwise become misshapen. Attempts to correct this condition have been made with expensive structures to hold the dough in place. Such structures have been provided with a plurality of positioning clasps or holding latches to hold pie crust or pie shell shapers in the correct position and in the proper spaced relation with the pie pan. The fastening of the clasps or latches before baking and the unfastening of same after baking were time consuming, difficult and often resulted in damaging of the pie shell, especially when engaged in making a number of pies.

The principal objects of the present invention are to provide a pie crust shaper to be placed on uncooked pie dough in a pie pan to retain the pie dough during baking thereby preventing buckling, bending, bubbling, blistering, warping or other distortions or irregularities forming in the pie dough; to provide such a pie crust shaper which will eliminate the aforementioned time consuming operations; to provide such a pie crust shaper which will eliminate the necessity of puncturing the pie dough with a fork or other sharp instrument; to provide such a pie crust shaper adapted for large scale or mass production baking operations where individual attention is not possible; to provide a pie crust shaper of the proper weight which will not crush or otherwise damage the pie dough or become displaced during baking of the pie dough; to provide such a pie crust shaper which will enable the user to observe the pie crust during the baking to thereby prevent under or over baking the pie crust shell; and to provide a pie crust shaper which is easily and economically manufactured and strong and durable in use.

Other objects and advantages of this invention will become apparent from the following description taken in connection with the accompanying drawings wherein are set forth by way of illustration and example certain embodiments of this invention.

Figure 1:
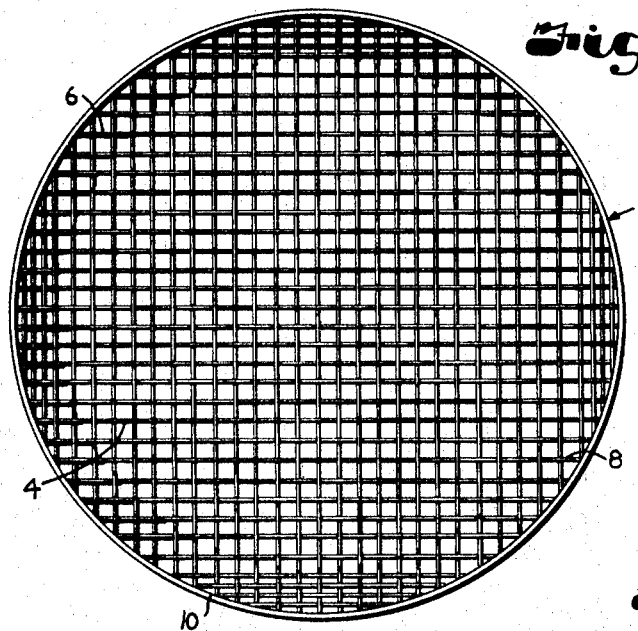
FIG. 1 is a plan view of the pie crust shaper.

Referring more in detail to the drawings:

The reference numeral 1 generally designates a pie crust or pie shell shaper formed of suitable material such as wire fabric, mesh or the like and for placing on uncooked pie dough 2 in a pie pan 3 substantially conforming to the dough shape and holding same during cooking. The shaper 1 has weight to hold the dough and is of open structure for escape of vapors and gases from the dough. The pie crust shaper 1 of the present invention is particularly adapted to be employed in baking pie crust shells in home baking or large scale baking operations. The pie crust shaper 1 is employed to insure that the pie crust shells will be properly baked to the correct thickness without warping, blistering, buckling, bending or other distortions or irregularities of the pie crust shell.

The pie crust shaper 1 preferably is formed of wire mesh to have a circular base portion 4 which will be parallel with and spaced apart from a base portion 5 of the pie pan 3 when the shaper 1 is in place on pie dough 2 in the pie pan 3. An intermediate portion 6 of the pie crust shaper 1 slopes upwardly and outwardly from the base portion 4 so as to be parallel with and spaced apart from an intermediate portion 7 of the pie pan 3, when in place on the pie dough 2. An annular rim portion 8 extends outwardly from the top of the intermediate portion 6 so as to be parallel with and spaced apart from a rim portion 9 of the pie pan 3, when in place on the pie dough 2. An annular ring 10 is connected to the periphery of the annular rim portion 8 to strengthen the periphery of the shaper 1. The ring 10 is concentric with the circular base portion 4 and spaced inwardly from a peripheral edge 11 of the rim portion 9 whereby the dough or said rim may be shaped or finished.

The wire mesh consists of wire of a size and spacing to be of the proper weight to hold the pie crust shell in place in the pie pan 3 without damaging same such as $3/64$ inch wires forming $3/4$ inch mesh. The annular ring 10 may be in the nature of $3/32$ inch wire to strengthen the periphery of the rim portion 8. In the form illustrated, in FIG. 1, the wire mesh is reticulated.

For sanitary reasons it is preferred that the wire mesh be stainless steel, cadmium plated, Teflon coated or other suitable material usable with edible foods and which is easily cleaned and which will not tarnish or stain and be of the proper weight.

Figure 2:
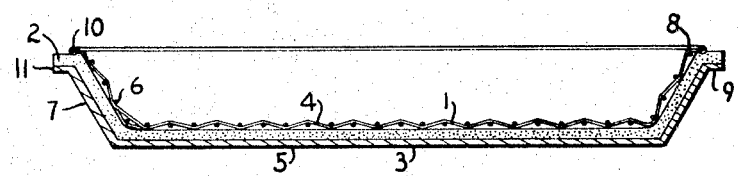
FIG. 2 is a vertical sectional view of the pie crust shaper in place on pie dough in a pie pan.

In use, the pie dough 2 to be baked into a shell, is placed in the pie pan 3 and the shaper 1 is then placed on top of the pie dough 2 as shown in FIG. 2. The wire mesh is particularly adapted to allow the user to observe the progress of the baking to insure that the pie crust shell will not be over or under baked. Thus the user may readily observe the shell to control the desired lightness or brownness. The shaper 1 is particularly useful for home baking and for large scale baking of shells for single crust pies such as pie shells to be filled with edible substances to make cream pies, custards, icebox pies and the like.

The shaper 1 is sized and shaped so as to substantially conform to the shape and configuration of the pie pan 3 and be a uniform distance away from corresponding parts of the pie pan 3 when placed on uncooked pie dough 2 in the pie pan 3 thereby permitting a uniform thickness in the pie shell.

Figure 3:
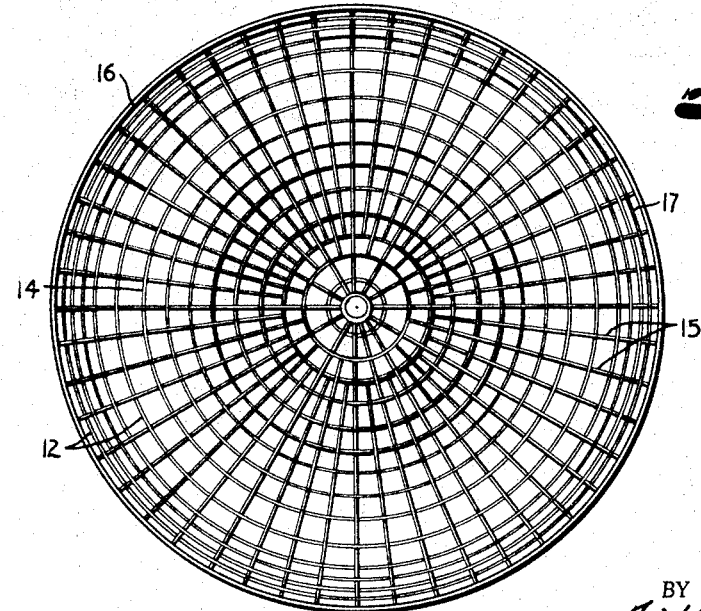
FIG. 3 is a plan view of a modified form of the pie crust shaper having concentric rings and radial wire spokes.

FIG. 3 illustrates a modified form of the present invention. The wire mesh is formed of concentric rings 12 preferably uniformly spaced from the center of a base portion 14 and connected together by radial wire spokes 15. An annular ring 16 is connected to the periphery of an annular rim portion 17 to strengthen the periphery of the rim portion 17.

In use, the form illustrated in FIG. 3 is placed on top of uncooked pie dough 2 in a pie pan 3. This form is also of a weight which will remain in place during baking and which will not crush or otherwise damage the pie dough 2. The modified form is also of a material usable with edible foods which will not tarnish or stain and which is easily cleaned.

It is to be understood that while certain forms of this invention have been illustrated and described, it is not to be limited to the specific form or arrangement of parts herein described and shown except insofar as such limitations are included in the claims.

What I claim and desire to secure by Letters Patent is:

1. A pie shell shaper for use with uncooked pie dough, said pie shell shaper comprising in combination:
    (a) an imperforate pie pan having a circular base portion with an intermediate portion sloping upwardly and outwardly from said base portion and an annular rim portion extending outwardly from an upper edge of said intermediate portion, said imperforate pie pan being adapted to receive and support uncooked pie dough;
    (b) a reticulated circular base portion formed of a plurality of wire members secured together at spaced intervals and defining an open structure, said reticulated circular base portion being adapted to be placed on said uncooked pie dough engaging said base portion of said imperforate pie pan;
    (c) a reticulated intermediate portion extending upwardly and outwardly from a periphery of said reticulated base portion, said reticulated intermediate portion being adapted to be placed on said uncooked pie dough engaging said intermediate portion of said imperforate pie pan;
    (d) an annular reticulated rim portion extending outwardly from an upper edge of said reticulated intermediate portion, said reticulated rim portion being adapted to be placed on a portion of said uncooked pie dough engaging said rim portion of said pie pan, said reticulated rim portion being parallel with said reticulated base portion;
    (e) an annular ring connected to the periphery of said annular reticulated rim portion, said annular ring being concentric with said reticulated base portion, said annular ring being spaced between said upper edge of said intermediate portion of said imperforate pie pan and the periphery of said rim portion of said imperforate pie pan; and
    (f) said reticulated base portion and intermediate portion and rim portion being sized to be arranged in spaced substantially parallel relation with said imperforate base portion and intermediate portion and rim portion respectively of the pie pan when in place engaging said pie dough thereon, said reticulated base portion and intermediate portion and rim portion being of a reticulated wire fabric having a wire size and spacing and weight to retain said pie dough in the shape of said imperforate pie pan interior during cooking.

2. The pie shell shaper as set forth in claim 1 wherein said reticulated wire fabric is formed of:
    (a) a plurality of concentric wire rings uniformly spaced from the center of said reticulated base portion; and
    (b) a plurality of radially extending wire spokes woven with and connected to said concentric rings, said wire spokes and concentric rings being sized and spaced to form substantially uniformly sized and shaped opening therebetween.

References Cited

UNITED STATES PATENTS

| | | |
|---|---|---|
| 298,339 | 5/1884 | Bender. |
| 612,803 | 10/1898 | Epstein. |
| 2,506,928 | 5/1950 | Klingbiel _____ 99—433 |
| 2,595,684 | 5/1952 | Lyons _____ 99—433 |
| 2,691,337 | 10/1954 | Forrest _____ 99—433 |
| 3,256,838 | 6/1966 | Booras _____ 107—57 |

WILLIAM I. PRICE, *Primary Examiner.*

ARTHUR O. HENDERSON, *Assistant Examiner.*